(12) United States Patent
Xue et al.

(10) Patent No.: US 8,510,415 B2
(45) Date of Patent: Aug. 13, 2013

(54) DATA DISTRIBUTION METHOD, DATA DISTRIBUTION SYSTEM AND RELEVANT DEVICES IN EDGE NETWORK

(75) Inventors: Chuansong Xue, Shenzhen (CN); Zhefeng Yan, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 143 days.

(21) Appl. No.: 12/493,539

(22) Filed: Jun. 29, 2009

(65) Prior Publication Data

US 2009/0271502 A1    Oct. 29, 2009

Related U.S. Application Data (63) Continuation of application No. PCT/CN2008/071000, filed on May 16, 2008.

(30) Foreign Application Priority Data

Oct. 9, 2007  (CN) .......................... 2007 1 0164303

(51) Int. Cl.
*G06F 15/16* (2006.01)
*G06F 15/173* (2006.01)

(52) U.S. Cl.
USPC ..................... 709/219; 709/223; 707/999.01

(58) Field of Classification Search
USPC .................. 709/216–219, 223; 707/999.001, 707/999.01
See application file for complete search history.

(56) References Cited

U.S. PATENT DOCUMENTS

| | | | |
|---|---|---|---|
| 5,765,407 A | | 6/1998 | Choo et al. |
| 7,565,407 B1 * | | 7/2009 | Hayball .................. 709/216 |
| 7,984,051 B2 * | | 7/2011 | Yoneyama .................. 707/736 |
| 2003/0051052 A1 * | | 3/2003 | Shteyn et al. .............. 709/245 |
| 2004/0162787 A1 * | | 8/2004 | Madison et al. ............. 705/64 |
| 2004/0225716 A1 | | 11/2004 | Shamir et al. |
| 2007/0027764 A1 * | | 2/2007 | Masuo ......................... 705/14 |
| 2007/0171827 A1 * | | 7/2007 | Scott et al. ................. 370/235 |
| 2007/0204115 A1 * | | 8/2007 | Abramson .................. 711/154 |

FOREIGN PATENT DOCUMENTS

| | | |
|---|---|---|
| CN | 1614931 A | 5/2005 |
| CN | 1710857 A | 12/2005 |
| CN | 1909509 A | 2/2007 |

(Continued)

OTHER PUBLICATIONS

International Search Report issued in corresponding PCT Application No. PCT/CN2008/071000; mailed Aug. 28, 2008.
Written Opinion of the International Searching Authority issued in corresponding PCT Patent Application No. PCT/CN2008/071000, mailed Aug. 28, 2008.

(Continued)

*Primary Examiner* — Jeong S Park
(74) *Attorney, Agent, or Firm* — Brinks Hofer Gilson & Lione (57) ABSTRACT

A data distribution method, a data distribution system and relevant devices in an edge network are provided. The method includes: obtaining a data download request from a client, and obtaining a content ID of data under a certain protocol, where the content ID is carried in the download request; and searching for an edge network content ID that corresponds to the content ID and uniquely identifies a data content in an edge network, obtaining corresponding client information by using the edge network content ID as an index, and returning data source information that carries the client information to the client. Therefore, the data is sharable as far as possible throughout the edge network, and the impact on the backbone network is relieved effectively.

10 Claims, 7 Drawing Sheets

(56) References Cited

FOREIGN PATENT DOCUMENTS

| | | |
|---|---|---|
| CN | 101409706 B | 11/2011 |
| JP | 2004252876 | 9/2004 |
| JP | 200734895 | 2/2007 |
| JP | 2007249514 | 9/2007 |
| KR | 2003-0009772 A | 2/2003 |
| WO | WO 2007/005131 A2 | 1/2007 |

OTHER PUBLICATIONS

Extended European Search Report issued in corresponding European Patent Application No. 08748606.4, mailed May 12, 2010.
Office Action issued in corresponding Chinese Patent Application No. 200710164303.7, mailed Jan. 19, 2011.
Office Action issued in corresponding Japanese Patent Application No. 2009-545809, mailed Jun. 28, 2011.

* cited by examiner

DATA DISTRIBUTION METHOD, DATA DISTRIBUTION SYSTEM AND RELEVANT DEVICES IN EDGE NETWORK

CROSS-REFERENCE TO RELATED APPLICATIONS

The present application is a continuation application of PCT/CN2008/071000, filed May 16, 2008, which claims the benefit of Chinese Patent Application No. 200710164303.7, filed Oct. 9, 2007, both of which are hereby incorporated by reference in their entirety.

FIELD OF THE APPLICATION

The present application relates to a data distribution technology, and in particular, to a data distribution method, and relevant devices and systems in an edge network.

BACKGROUND OF THE APPLICATION

With the popularity of the Internet technology, Peer-to-Peer (P2P) applications prevail on the Internet. In a P2P system, a P2P program of a terminal is both a client and a server.

Numerous Internet users use P2P software to download and share files, and a majority of such files are video files and software characterized by a great file length. Therefore, the downloading of P2P files occupies a lot of network bandwidth. Moreover, the P2P software selects partner peers blindly to some extent, thus generating immense disorderly traffic and imposing a huge impact on the backbone network.

In addition, many contents in different download protocols are repetitive, thus generating more repetitive traffic. The massive repetitive traffic leads to network congestion, and deteriorates the Quality of Service (QoS) of other network applications such as web browse and email.

To reduce the impact caused by the P2P downloading onto the backbone network, a P2P cache technology is applied in the conventional art to control the P2P traffic. The P2P cache needs to perform deep packet inspection for each packet, specifically, match the mode of each packet, judge whether the packet has P2P features, and finally make a conclusion about whether the packet is a P2P packet. For example, the packets of the Bit-Torrent (BT) protocol generally carry a BitTorrent identifier. Therefore, the packets with a BitTorrent identifier may be determined as BT protocol packets. The P2P cache supports a specific P2P protocol (for example, eMule, BT, FastTrack and Gnutella), and buffers the transferred P2P packets locally. If packet analysis shows that other users are requesting the same packet, the packet is sent to such users directly, and thus the traffic across the edge network is reduced.

The defects of the conventional art may be: The P2P cache needs to perform deep packet inspection for all routed packets, thus affecting the response speed of the whole network to some extent. Moreover, some protocol encryption and spoofing technologies are generally applied to the P2P client currently so that it is difficult to filter the P2P packets. Therefore, the conventional art is not enough for relieving the impact caused by the P2P packets onto the backbone network.

SUMMARY OF THE APPLICATION

An embodiment of the present disclosure provides a data distribution method that reduces the P2P packet traffic in the backbone network.

The file data distribution method provided in an embodiment of the present disclosure is implemented through this technical solution: obtaining a data download request from a client, and obtaining a content ID of data under a specific protocol, where the content ID is carried in the download request; and searching for an edge network content ID that corresponds to the content ID and uniquely identifies a data content in the edge network, obtaining the corresponding client information by using the edge network content ID as an index, and returning the data source information that carries the client information to the client.

Further, the technical solution includes: if the edge network content ID is not found, downloading the data requested by the client to a local storage device, and calculating and storing the edge network content ID of the data; and sending the edge network content ID and the data source information that carries the local storage device information to the client.

A data distribution system is provided according to an embodiment of the present disclosure. The system includes:

a request route server, adapted to: obtain a data download request from a client, where the request carries the content ID of data to be downloaded by the client under a protocol; search for an edge network content ID corresponding to the content ID under the protocol, obtain the corresponding client information by using the edge network content ID as an index, and return the data source information that carries the client information to the client; send the edge network content ID returned by a download proxy server and the data source information that carries the proxy server information to the client; and save the mapping between the edge network content ID and the content ID; and the download proxy server, adapted to: download data according to a notification from the request route server, and return the edge network content ID.

A client is provided according to an embodiment of the present disclosure. The client includes:

a user download interface, adapted to: resolve a download protocol instruction of a user, and obtain the content ID of data that the user requests to download under the protocol;

a first request route server interaction managing unit, adapted to perform data interaction with a request route server through a first connection managing unit, including sending a data download request carrying the content ID to the request route server, and obtaining the data source information sent by the request route server and the edge network content ID of the data to be downloaded;

a download managing unit, adapted to download data from the data source according to the edge network content ID; and the first connection managing unit, adapted to perform data interaction with an external device.

A request route server is provided in an embodiment of the present disclosure. The request route server includes:

a protocol mapping unit, adapted to: maintain a mapping between the content ID of data under a protocol and an edge network content ID, search for the edge network content ID according to the obtained content ID sent by a first client, and notify a client managing unit if the edge network content ID is found;

the client managing unit, adapted to: maintain information about clients that download the same data by using the edge network content ID as an index, obtain the corresponding client information according to the edge network content ID found by the protocol mapping unit, send the client information to a first client interaction managing unit, and add the mapping between the edge network content ID and the first client;

the first client interaction managing unit, adapted to perform message interaction with a downloading client through a second connection managing unit, including sending the data source information that carries the client information and the edge network content ID to the first client; and the second connection managing unit, adapted to perform message interaction with an external device.

A download proxy server is provided according to an embodiment of the present disclosure. The download proxy server includes:

a third connection managing unit, adapted to perform data interaction with an external device;

a second client interaction managing unit, adapted to perform data interaction with a client through the third connection managing unit;

a second request route server interaction managing unit, adapted to perform data interaction with a request route server through the third connection managing unit, including obtaining a data download notification from the request route server, sending the data download notification to a download proxy unit, receiving an edge network content ID returned by the download proxy unit, and sending the edge network content ID to the request route server;

the download proxy unit, adapted to: download data according to the download notification, and calculate the edge network content ID; and a storing unit, adapted to store and manage data contents, including the edge network content ID and the data corresponding to the edge network content ID.

During the research on the conventional art, the inventor of the present disclosure finds that the contents that a user requests to download under different download protocols are generally the same except for the content ID and the check mode. Therefore, based on this feature, the inventor works out the technical solution of the present disclosure by integrating the feature with the edge network. The technical solution is: mapping the content ID of the stored data under different protocols to the edge network content ID under a unified standard according to the mapping between the content ID of the stored data and the edge network content ID, searching out the devices that already store the same data in the same edge network, and sending the information about such devices and the edge network content ID of the data to the client that requests to download the data. Therefore, the devices that already store the same data may serve as data sources and provide the data to be downloaded to the client that requests to download the data.

In the conventional art, the content ID of data under a protocol is unidentifiable to other download protocols. Consequently, the device in the edge network downloads the same data contents repeatedly through the backbone network. In contrast to the conventional art, the embodiments of the present disclosure use a unified ID to identify the data contents throughout the edge network, thus avoiding the defect that the same data content has different IDs under different protocols in the conventional art. Therefore, the data in the edge network is maximally sharable, and repeated download of the same data content through the backbone network is avoided. Thus the impact on the backbone network is relieved. Moreover, the speed of the whole network is not reduced as against the P2P cache technology in the conventional art.

DETAILED DESCRIPTION

The present disclosure aims to relieve the impact caused by download of data on the backbone network in the conventional art. Therefore, a data distribution method, a data distribution system, and relevant devices are provided in the embodiments of the present disclosure. The embodiments of the present disclosure are detailed below.

Figure 1:
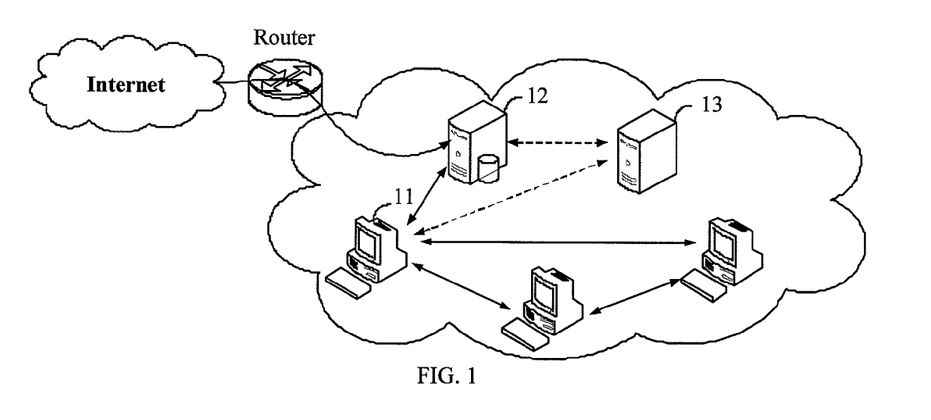
FIG. 1 shows a structure of a data distribution system provided according to an embodiment of the present disclosure.

To achieve the foregoing objectives, as shown in FIG. 1, a request route server 12 and a download proxy server 13 are set in an edge network, and combined with a client 11 provided in an embodiment of the present disclosure to implement download of the data to the client 11. The client 11 stores the names and IDs of specific supported protocols (for example, the BT protocol, eMule protocol, and FTP/HTTP). To download data under a protocol, the client 11 sends a download request to the request route server 12, where the request carries the ID of the specific protocol and the content ID of the data in the specific protocol. After receiving the download request, the request route server 12 searches the mapping table corresponding to the protocol, and maps the content ID of the data to an edge network content ID under a unified standard. According to the edge network content ID, the request route server 12 searches out the information about other clients that download or store the same file, and returns the information to the client that sends the download request.

The process of the embodiment of the present disclosure is described below with reference to accompanying drawings.

Figure 2:
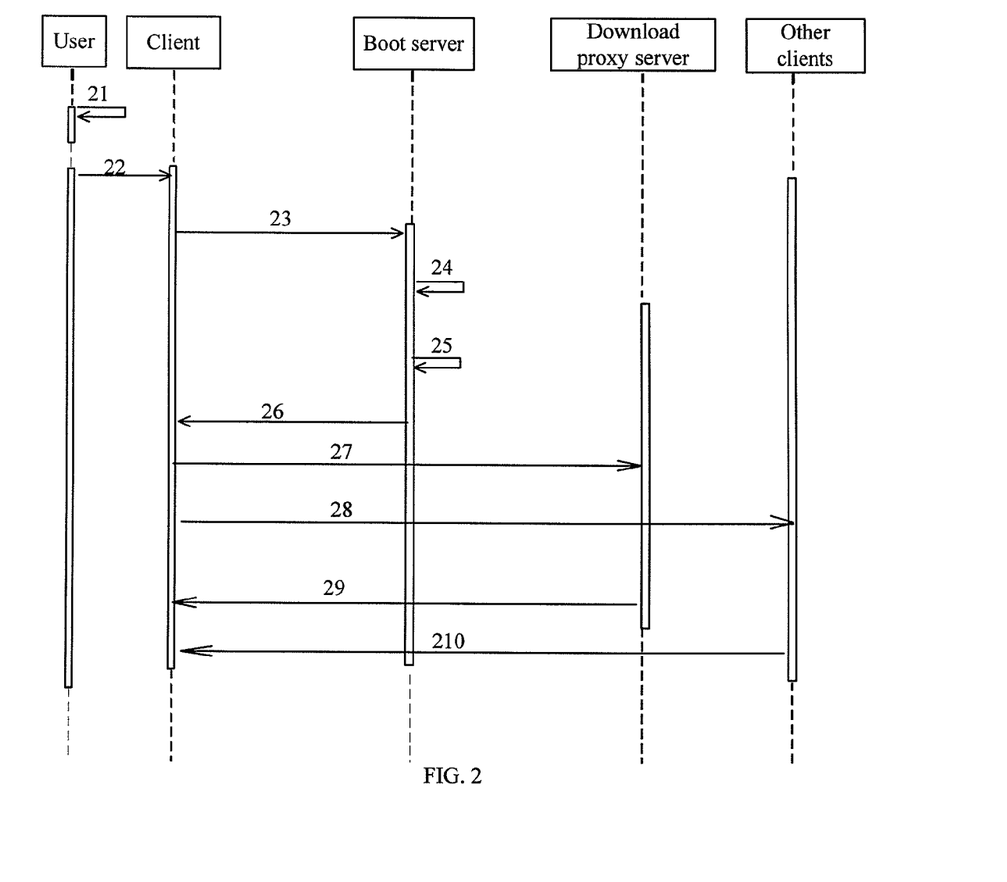
FIG. 2 is a first flowchart of a system provided according to an embodiment of the present disclosure.

FIG. 2 shows a normal process of downloading data to the client. As shown in FIG. 2, the process includes the following steps:

21. The user chooses to download data.

22. The client is triggered.

23. The client sends a download request to the request route server. The format of the request is described in the embodiment of the client.

24. The request route server searches for the protocol mapping unit to check whether the content to be downloaded exists (this embodiment supposes that the content exists).

25. The request route server records the client information in the list of clients that download the file.

26. The request route server sends a download response message to the downloading client, where the response message carries the edge network content ID, download proxy server information, and the information about other clients that are downloading the same file. The format of the response message is described in the embodiment of the client.

27. The client sends a download request to the download proxy server.

28. The client sends the download request to other clients that are downloading the same file.

29. The client downloads the file data from the download proxy server.

210. The downloading client downloads the data from other clients.

Figure 3:
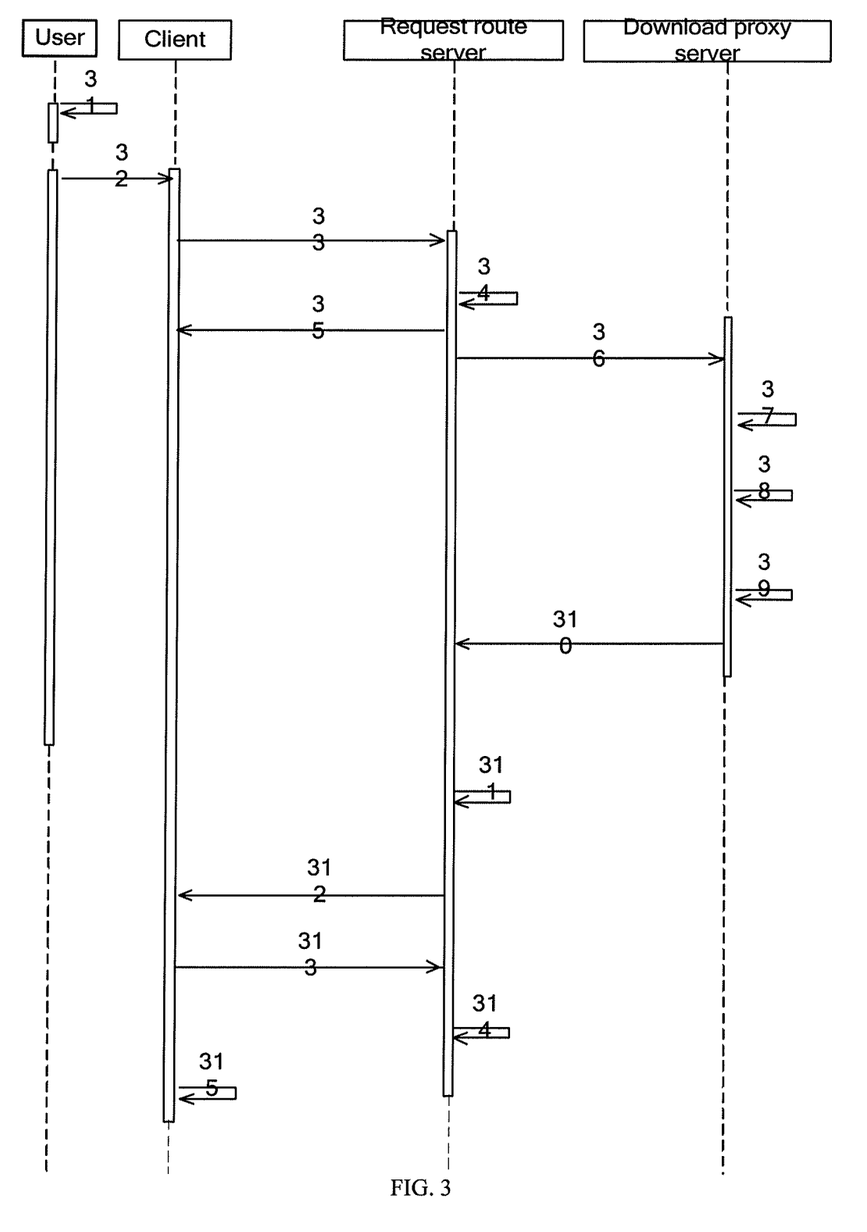
FIG. 3 is a second flowchart of a system provided according to an embodiment of the present disclosure.

In step 24 of the foregoing process, it is supposed that the request route server searches for the protocol mapping unit and successfully obtains the content to be downloaded. If no such content exists in the protocol mapping unit, the process illustrated in FIG. 3 applies:

31. The user chooses to download data.

32. The client is triggered.

33. The client sends a download request to the request route server. The format of the request is described in the embodiment of the client.

34. The request route server searches for the protocol mapping unit to check whether the content to be downloaded exists (this embodiment supposes that the content does not exist).

35. The request route server sends a download response message to the client, notifying the client that the content to be downloaded does not exist in the mapping unit.

36. The request route server sends a download notification message to the download proxy server. The download notification message carries the data required for the download process, for example, the download protocol applied, and the content ID. Details are provided in the embodiment of the request route server.

37. The data is downloaded as instructed by the download notification according to the corresponding download protocol.

38. A part of the file data is downloaded, and the temporary content ID of the edge network is calculated.

A method for obtaining the temporary content ID of the edge network is described in the following embodiment. The embodiment shows that the temporary content ID of the edge network is obtained according to a part of the data contents downloaded currently. The method is:

downloading the file header data of a preset length and downloading the file trailer data of a preset length according to the preset rules, and calculating out the temporary content ID of the edge network of the part of downloaded data according to the following method:

Hash (file header data of a preset length+file trailer data of a preset length+file length).

Alternatively, the temporary content ID of the edge network may be calculated out according to the parameters such as file length.

39. A judgment is made about whether the data content is already stored locally according to the temporary content ID of the edge network. If the data content is already stored locally, the corresponding edge network content ID is searched out, and the download is stopped (this embodiment supposes that the data content is already stored locally).

310. The download proxy server reports the edge network content ID of the data to the request route server.

311. The data content information, including the mapping between the edge network content ID and the content ID, is added to the protocol mapping unit. The format of the data content information is described in the foregoing section about the protocol mapping unit in the request route server.

312. The request route server sends a download notification message to the client, where the message carries the edge network content ID, download proxy server information, and the information about other clients that are downloading the same file.

313. The client returns a download notification response message.

314. Corresponding to the data content that is being downloaded currently, the information about this client is added to the client managing unit of the request route server.

315. The client downloads data from the download proxy server and other clients that are downloading the same file, as detailed in steps 27-210 in the process shown in FIG. 2.

In step 39 in the process shown in FIG. 3, it is supposed that the download proxy server finds that the data content being downloaded currently is stored locally. If the data content being downloaded currently is not stored locally, the process shown in FIG. 4 applies.

Figure 4:
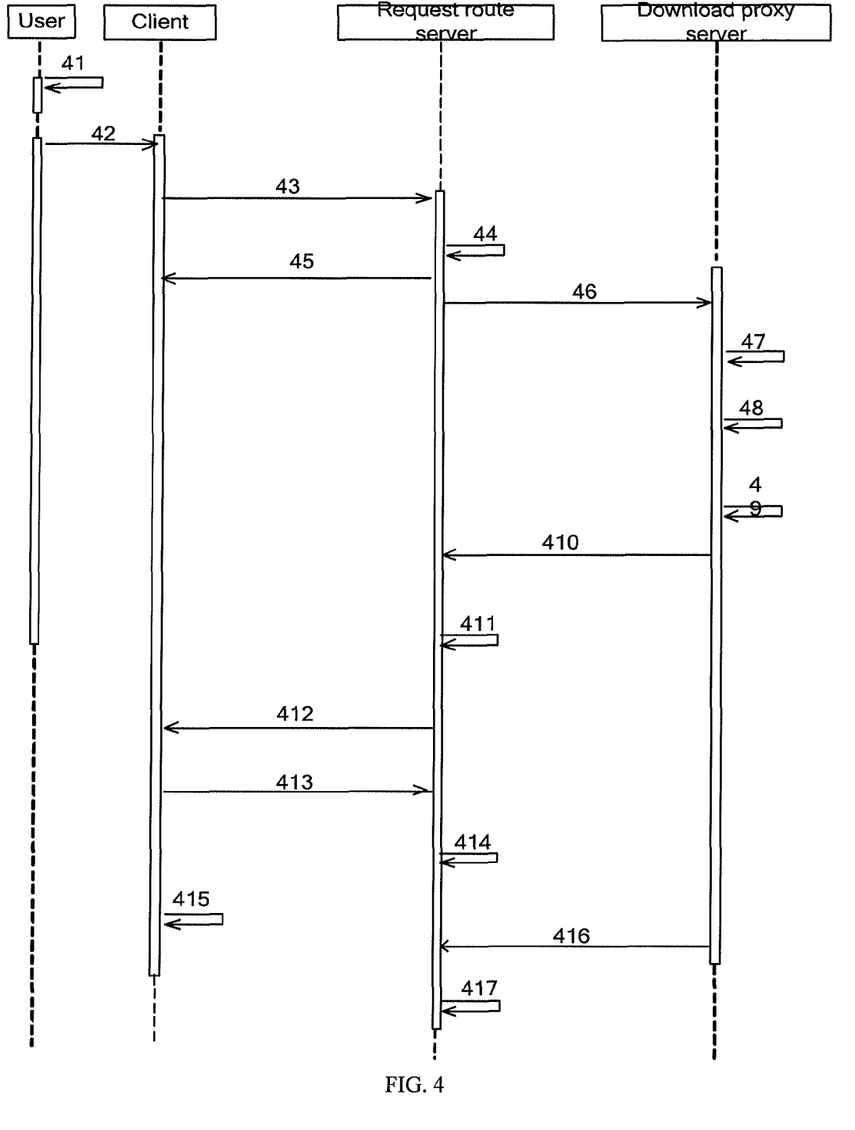
FIG. 4 is a third flowchart of a system provided according to an embodiment of the present disclosure.

41. The user chooses to download data.

42. The client is triggered.

43. The client sends a download request to the request route server. The format of the request is described in the section about the client.

44. The request route server searches for the protocol mapping unit to check whether the content to be downloaded exists (this embodiment supposes that the content does not exist).

45. The request route server sends a download response message to the client, notifying the client that the content to be downloaded does not exist in the mapping unit.

46. The request route server sends a download notification message to the download proxy server. The download notification message carries the data required for the download process, for example, the download protocol applied, and the content ID. Details are provided in the embodiment of the request route server.

47. The download proxy server downloads the data as instructed by the download notification message according to the corresponding download protocol.

48. A part of the file data is downloaded, and the temporary content ID of the edge network is calculated.

49. A judgment is made about whether the data content is already stored locally according to the temporary content ID of the edge network. This embodiment supposes that the data content being downloaded currently is not stored locally. Therefore, the download proxy server continues downloading the file.

410. The temporary content ID of the edge network and the temporary content ID timestamp of the edge network are reported to the request route server.

The temporary content ID of the edge network is calculated out before completion of downloading the data content. Besides, according to the method for generating the temporary content ID of the edge network in this embodiment, considering the possibility that the temporary content ID of the edge network is the same but the file is different, the temporary content ID timestamp information of the edge network is further included in this embodiment.

411. The file information is added to the protocol mapping unit.

412. The request route server sends a download notification message to the client, where the message carries the temporary content ID of the edge network, download proxy server information, and the information about other clients that are downloading the same file.

413. The client returns a download notification response message.

414. Corresponding to the data content that is being downloaded currently, the information about this client is added to the client managing unit of the request route server.

415. The client downloads data from the download proxy server and other clients that are downloading the same file, as detailed in steps 27-210 in the process shown in FIG. 2.

416. Upon completion of downloading the data, the download proxy server calculates the edge network content ID and reports it to the request route server.

417. The edge network content ID information is added to the client managing unit. The specific storage format is described in the relevant section about the request route server. The temporary content ID of the edge network is stored in the protocol mapping unit.

In the process shown in FIG. 4, the client may download a part of data already downloaded by the download proxy server according to the temporary content ID of the edge network. However, this embodiment does not preclude the practice of forbidding downloading the data content before the edge network finishes downloading the data from the backbone network. The practice does not involve the foregoing temporary content ID of the edge network. Nevertheless, the present disclosure does not preclude the practice of obtaining the edge network content ID and/or the temporary content ID of the edge network through other algorithms or by other means.

With reference to the foregoing process, the method applied in the system in this embodiment is:

obtaining a data download request from a client, and obtaining a content ID of data under a specific protocol, where the content ID is carried in the download request; searching for an edge network content ID corresponding to the content ID, and, if the edge network content ID is found, obtaining the corresponding client information by using the edge network content ID as an index, and returning the data source information that carries the client information to the client, or, if the edge network content ID is not found, downloading the data requested by the client to a local storage device, and calculating and storing the edge network content ID of the data; and sending the edge network content ID and the data source information that carries the local storage device information to the client.

In the foregoing method, if the edge network content ID corresponding to the content ID is not found, a part of the file data is further downloaded according to the preset rules and the temporary content ID of the edge network is calculated out before completion of downloading the data to the local storage device. Moreover, the stored temporary content IDs of the edge network are searched, if a matching temporary content ID of the edge network is found, it is determined that the proxy server already stores the data being downloaded currently, and the edge network ID of the data is sent to the client. Otherwise, the temporary content ID of the edge network is sent to the client.

On the basis of the foregoing method, the check data of the data corresponding to the matching temporary content ID of the edge network specific to the currently used download protocol is obtained. If the check data is the same as the check data of the data being downloaded currently, it is determined that the proxy server already stores the data being downloaded currently.

It is understandable to those skilled in the art that all or part of the steps in the foregoing embodiments may be performed through hardware instructed by a program. The program may be stored in a computer-readable storage medium such as a Read-Only Memory/Random Access Memory (ROM/RAM), a magnetic disk, and a compact disk.

The devices in the foregoing edge network system are detailed below.

Figure 5:
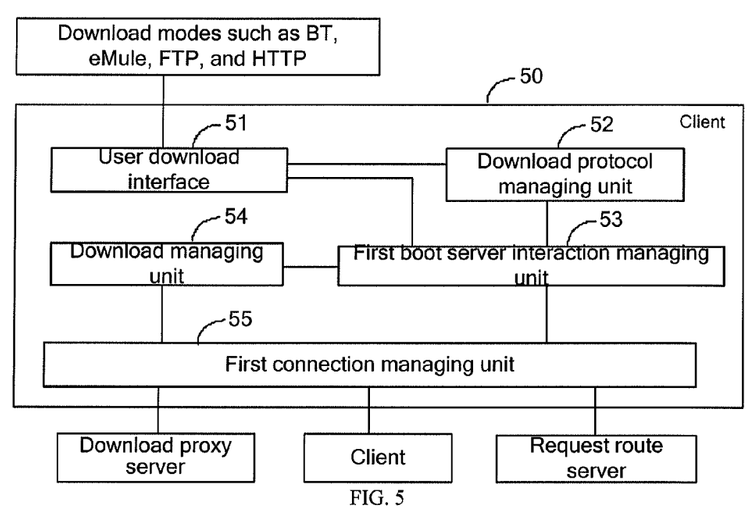
FIG. 5 shows a structure of a client according to an embodiment of the present disclosure.

As shown in FIG. 5, a client device 50 provided according to an embodiment of the present disclosure includes: a user download interface 51, a download protocol managing unit 52, a first request route server interaction managing unit 53, a download managing unit 54, and a first connection managing unit 55.

The user download interface 51 provides a unified download interface for the user. Those skilled in the art may formulate a user download interface for the embodiments of the present disclosure according to various download protocols disclosed currently to support multiple download protocols such as BT, eMule, FTP and HTTP. The download interface resolves the user download instructions based on the download protocols to obtain the content ID of the data that the user requests to download under the protocol.

To facilitate distribution and sharing of data, the conventional download protocols identify the data content according to respective identification modes.

Taking the BT protocol as an example, the BT seed primarily includes a URL list of the tracker server, Name, Piece length, Pieces, Length, and Path. "Name" is a string, and its default value generally applies at the time of saving a file; "Piece length" is the length of the transmitted file fragment, and is generally 256 KB; "Pieces" is composed of several 20-byte strings, and each string is the Hash value of the corresponding fragment; "Length" is the file length; and "Path" is a list of the subdirectory names. "Name", "Piece length", "Pieces", "Length", and "Path" are the information (Info) about the content corresponding to the BT seed. The mode of identifying the content in BT is: performing an SHA1 encryption operation for the Info to obtain a 20-byte value.

In another example, the method for calculating file check data in the eMule protocol is: dividing the file into blocks, each of which is 9.28 MB in size (the last block may be smaller than 9.28 MB), and calculating the check value of each block through an MD4 algorithm. The method for identifying a content in the eMule protocol is: performing MD4 encryption for the foregoing check data to obtain a Hash value on the basis of the MD4 algorithm.

Moreover, the method for calculating the content ID in the FTP or HTTP protocol is as follows:

Hash (URL+content size+modification time)

where the URL is a uniform resource locator. Besides, the modification time is considered because the same URL has the same size, but its content may be different after modification. Therefore, the modification time is considered in calculating the content ID to improve the reliability of the calculated content ID. However, the modification time is not indispensable for calculating the content ID of the data under the FTP or HTTP protocol.

For the BT protocol, the content ID of the data may be composed of the directory ID in the seed and the corresponding file sequence number. The BT protocol identifies the content per directory. One directory may include multiple subdirectories and multiple files. Therefore, if multiple layers of directories are nested in a seed directory in this embodiment, the directory ID and the corresponding file sequence number may be obtained by traversing the directory deeply and preferentially. However, those skilled in the art may still use common bibliographical methods to obtain the directory ID that constitutes the content ID and the corresponding file sequence number.

The download protocol managing unit 52 records the download protocol supported by the client. Given below is an embodiment of a record format.

| Protocol ID | Protocol name |
|---|---|

The download protocol managing unit provides protocol support for the user download interface to resolve user instructions. The download protocol managing unit records the protocols supported by the client, and allocates a protocol ID to each protocol. The protocol ID is consistent with the protocol ID on the request route server. The first request route server interaction managing unit invokes the download protocol managing unit to obtain the protocol ID, and sends the protocol ID and the corresponding content ID to the request route server. Therefore, the request route server may use the protocol consistent with the client download protocol to download the data corresponding to the content ID under this protocol.

Different from the client shown in FIG. 5, another client is provided according to an embodiment of the present disclosure, where the interrelation between the first request route server interaction managing unit and the download protocol managing unit may be cancelled, and the user download interface provides the protocol ID directly.

The download managing unit 54 is adapted to download data contents from the content source (for example, a download proxy server, other clients that download or store the data requested by this client, and an FTP or HTTP server), where the data contents are stored on a storage medium such as a magnetic disk. Specifically, in this embodiment, the data content in the edge network is identified by an edge network content ID. Therefore, the download managing unit downloads the requested data from the data source according to the edge network content ID.

The first request route server interaction managing unit 53 is responsible for data/message interaction with the request route server, including: sending a data download request to the request route server, where the request carries at least the content ID of the data; and obtaining data source information sent by the request route server and the edge network content ID of the data to be downloaded, whereby the download managing unit downloads the data according to at least the data source information and the edge network content ID.

The first connection managing unit 55 is adapted to perform data interaction with the external device.

As described above, the download managing unit downloads data from the content source through the first connection managing unit 55. The following embodiment of the present disclosure provides a format of a message interface between the client and the data source (including the message interface between clients, and the message interface between a client requesting to download data and the download proxy server provided herein). The message interface comes in three types:

(1) Handshake and Response Message

The format of the handshake message is shown below:

| Edge network content ID | Temporary content ID of the edge network | Temporary content ID timestamp of the edge network |
|---|---|---|

The edge network content ID is a uniformly formatted identifier of complete data contents shared in the edge network in an embodiment of the present disclosure. In a handshake message, the edge network content ID may be empty because: When the client requests to download a data content, it is possible that a part of the data content (namely, incomplete data content) is stored in the edge network currently (that is because the edge network is downloading but has not finished downloading the data content from the backbone network). Therefore, the remaining part of the data content is still to be downloaded and has no edge network content ID.

An optimization measure is provided in an embodiment of the present disclosure: For the data content being downloaded from the backbone network (in this embodiment, the download proxy server performs this function), a temporary content ID of the edge network replaces the edge network content ID to identify the data content. In this way, the client does not need to wait for completion of downloading the data content from the backbone network to the edge network before beginning the download. Instead, the client downloads the data along with the download progress of the edge network (download proxy server). Before completion of downloading the data content, the client may download the data that has been downloaded to the edge network (download proxy server) first.

To implement the foregoing measure, the handshake message provided in a preferred embodiment of the present disclosure further carries a temporary content ID of the edge network (the generation method thereof is described later) on the basis of the edge network content ID.

Further, the temporary content ID of the edge network is calculated out before completion of downloading the data content. Besides, according to the method for generating the temporary content ID of the edge network to be described later, considering the possibility that the temporary content ID of the edge network is the same but the file is different, the temporary content ID timestamp information of the edge network is further included in the handshake message in this embodiment.

However, this embodiment does not preclude the practice of forbidding downloading the data content before the edge network finishes downloading the data from the backbone network. The practice does not involve the foregoing temporary content ID of the edge network. Nevertheless, the present disclosure does not preclude the practice of obtaining the edge network content ID and/or the temporary content ID of the edge network through other algorithms or by other means.

Corresponding to the format of the handshake message provided above, the format of the handshake response message provided in this embodiment is shown below:

| Response ID | Edge network content ID | Temporary content ID of the edge network | Temporary content ID timestamp of the edge network |
|---|---|---|---|

(2) Data Request and Response Message

The format of the data request message is shown below:

| Edge network content ID | Temporary content ID of the edge network | Temporary content ID timestamp of the edge network | File fragment index |
|---|---|---|---|

The format of the data request response message is shown below:

| Edge network content ID | Temporary content ID of the edge network | Temporary content ID timestamp of the edge network | File fragment index | Corresponding file fragment data |
| --- | --- | --- | --- | --- |

As shown in the foregoing table, the data in the edge network is shared through a fragment download mode in this embodiment. However, the present disclosure does not intend to limit the mode of downloading the data in the edge network. The data in the edge network may be downloaded in other modes than the fragment download mode. For example, the data may be shared between clients through an absolute offset of the file header. For instance, client A asks client B to request the content that starts with the 2000$^{th}$ byte and ends with the 3000$^{th}$ byte in the file header.

(3) Data Check Request Message and its Response Message

The format of the data check request message is shown below:

| Response ID | Edge network content ID | Temporary content ID of the edge network | Temporary content ID timestamp of the edge network |
| --- | --- | --- | --- |

The format of the data check request response message is shown below:

| Edge network content ID | Temporary content ID of the edge network | Temporary content ID timestamp of the edge network | File fragment index | Check data corresponding to the fragment |
| --- | --- | --- | --- | --- |

Generally, the check on the interaction data is necessary in the data interaction process. Therefore, to improve the data reliability, this embodiment provides the formats of a data check request message and its response message. Such formats are based on the formats of the data request message and its response message provided in (2).

Figure 6:
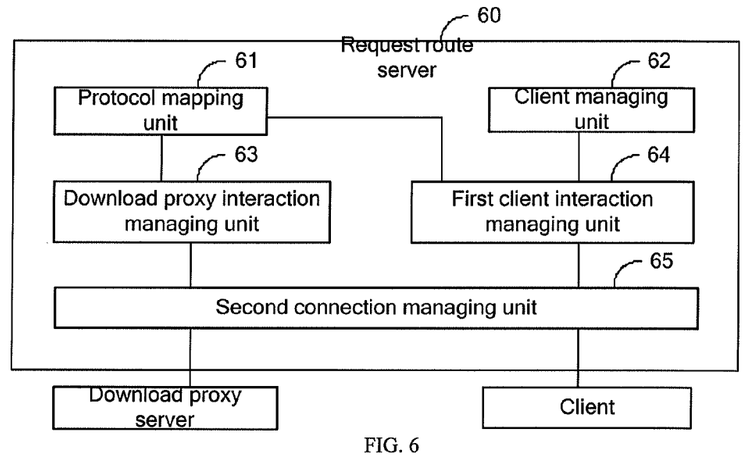
FIG. 6 shows a structure of a request route server in an embodiment of the present disclosure.

A request route server 60 provided according to an embodiment of the present disclosure is detailed below with reference to FIG. 6. As shown in FIG. 6, the request route server includes: a protocol mapping unit 61, a client managing unit 62, a download proxy interaction managing unit 63, a first client interaction managing unit 64, and a second connection managing unit 65.

The protocol mapping unit 61 identifies the data content per file, for example, maintains the mapping between the content ID of the data under a protocol and the edge network content ID. Further, the protocol mapping unit 61 searches for the edge network content ID according to the obtained content ID sent by the first client. If any edge network content ID is found, the protocol mapping unit 61 maps the content ID in other various download protocols to the edge network content ID, and notifies the client managing unit; otherwise, the protocol mapping unit 61 notifies the download proxy interaction managing unit.

The format of identifying the data per file in the protocol mapping unit is shown below. The format includes: protocol ID, content ID of the original download protocol, and edge network content ID.

| Protocol ID | Content ID | Edge network content ID |
| --- | --- | --- |

If a temporary content ID of the edge network is also applied in the system of the present disclosure, the protocol mapping unit further stores the following ID formats: protocol ID, content ID, temporary content ID of the edge network, temporary content ID timestamp of the edge network, and so on. The temporary content ID of the edge network corresponding to the content ID and the temporary content ID timestamp of the edge network are searched out according to the following table if the protocol mapping unit finds no corresponding edge network content ID in the foregoing table according to the content ID (namely, if the edge network content ID in the foregoing table is empty).

| Protocol ID | Content ID | Temporary content ID of the edge network | Temporary content ID timestamp of the edge network |
| --- | --- | --- | --- |

The client managing unit 62 records the information about the clients that download the same file, and more specifically, maintains the information about the clients that download the same data by using the edge network content ID as an index, obtains the corresponding client information according to the edge network content ID found by the protocol mapping unit, sends the client information to the first client interaction managing unit, and further records the mapping between the edge network content ID and the client when the client agrees to download the file.

The format of recording the information in the client managing unit is illustrated below:

| Edge network content ID | Temporary content ID of the edge network | List of clients |
| --- | --- | --- |

The list of clients may be in the following format:

| Client IP address | Client port number | Seed user or not |
| --- | --- | --- |

The download proxy interaction managing unit 63 performs message interaction with the download proxy server through the second connection managing unit, including sending a data download request to the proxy server according to the notification of the protocol mapping unit.

The message interface between the request route server and the download proxy server carries two types of messages:

(1) Download Notification Message and its Response Message

After the request route server receives the download request from the downloading client, if the protocol mapping unit fails to find the corresponding record (namely, fails to find the corresponding edge network content ID according to the content ID carried in the download request message of the client), the request route server sends a download notification message to the download proxy server. The message format is as follows:

| Protocol ID | Content ID | Protocol-related data |
| --- | --- | --- |

As shown in the foregoing table, the request message carries a protocol ID, a content ID, and protocol-related data (for example, check data in the BT seed).

(2) Edge Network Content ID Report Message and its Response Message

The download proxy server reports the edge network content ID to the request route server, where the edge network content ID is applied by the request route server to notify the download proxy server to download data.

In this embodiment, after obtaining the download notification message, the download proxy server further judges whether the data content to be downloaded as notified by the request route server has been stored locally. In this case, the request route server can send the content ID instead of the edge network content ID to the download proxy server through a download notification message. Therefore, the download proxy server makes a judgment in this process: The download proxy server downloads a part of the file data according to the instruction of the request route server, calculates out the temporary content ID of the edge network according to the part of the data content, and searches for the temporary content ID of the edge network of the stored data to check whether the file already exists. If the file already exists, the download proxy server searches out the edge network content ID of the data and reports it to the request route server. If no such file exists, the download proxy server reports the temporary content ID of the edge network (and may further report the temporary content ID timestamp of the edge network). Moreover, after the data content is downloaded, the download proxy server calculates the edge network content ID according to the complete data content, and reports the edge network content ID, the temporary content ID of the edge network, and the temporary content ID timestamp of the edge network to the request route server. After receiving the report message, the request route server sends a response message to the download proxy server. (The structure and functions of the download proxy server are described later herein.)

Evidently, the processing mode after the foregoing judgment indicates that the client is allowed to begin downloading the data before the edge network finishes downloading the data from the backbone network. If the system does not allow the client to begin downloading the data before the edge network finishes downloading the data from the backbone network, when the download proxy server determines that the data to be downloaded as notified by the request route server is not stored locally, the download proxy server continues downloading data from the backbone network, without sending any temporary content ID of the edge network to the request route server. Upon completion of downloading the data from the backbone network, the download proxy server reports the edge network content ID, the temporary content ID of the edge network, and the temporary content ID timestamp of the edge network to the request route server.

The first client interaction managing unit 64 performs message interaction with the downloading client through the second connection managing unit, including sending the data source information that carries the client information and the edge network content ID to the first client.

The message interface between the client and the request route server carries two types of messages:

(1) Download Request Message and its Response Message

The client sends a download request message to the request route server, and the request route server returns a download response message.

As shown in the following table, the download request message carries the protocol ID used for downloading the data, the content ID of the data under the protocol, and the data related to the protocol (for example, check data in the BT seed).

| Protocol ID | Content ID | Protocol-related data |
| --- | --- | --- |

As shown in the following table, the response message carries a response ID and optional data. For example, if the response ID is 1, it indicates that the data to be downloaded as requested by the client exists in the edge network (other clients or download proxy servers). In this case, the optional data is: edge network content ID of the data in the edge network, temporary content ID of the edge network, temporary content ID timestamp of the edge network, proxy server information, and client information.

| Edge network content ID | Temporary content ID of the edge network | Temporary content ID timestamp of the edge network | IP address of the proxy server | Port number of the proxy server | List of clients |
| --- | --- | --- | --- | --- | --- |

The elements in the list of clients may include: client IP address, client port number, and seed user or not.

(2) Download Notification Message and its Response Message After Receiving the edge network content ID reported by the download proxy server, the request route server notifies the client to perform download. The notification message carries an edge network content ID, a temporary content ID of the edge network, and a temporary content ID timestamp of the edge network. After receiving the download notification message, the client sends a response message. The response message indicates either consent to or cancellation of the data download.

The second connection managing unit 65 is adapted to perform message interaction with the external device.

Figure 7:
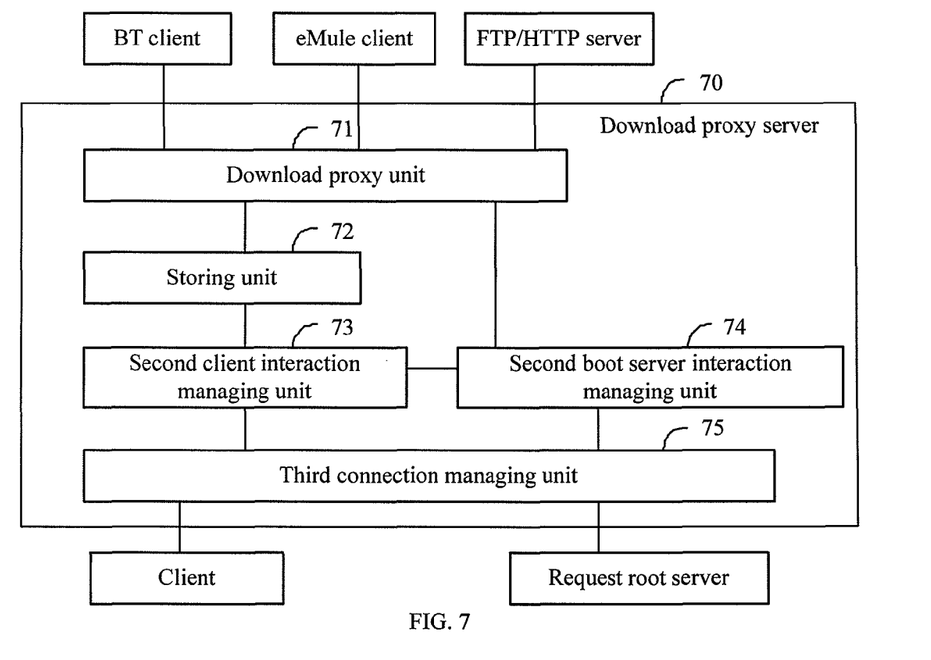
FIG. 7 shows a structure of a download proxy server according to an embodiment of the present disclosure.

FIG. 7 illustrates a download proxy server 70 provided in an embodiment of the present disclosure. As shown in FIG. 7, the download proxy server 70 includes: a download proxy unit 71, a storing unit 72, a second client interaction managing unit 73, a second request route server interaction managing unit 74, and a third connection managing unit 75.

The third connection managing unit 75 is adapted to perform data interaction with the external device.

The second client interaction managing unit 73 is adapted to perform data interaction with the client through the third connection managing unit. As regards the format of the interface between the download proxy server and the client, the foregoing format of the interface between the client and the data source serves as a reference.

The second request route server interaction managing unit 74 performs data interaction with the request route server through the third connection managing unit, including obtaining the data download notification from the request route server, sending the data download notification to the download proxy unit, and sending the edge network content ID to the request route server. As regards the format of the interface between the download proxy server and the request route server, the foregoing section about the request route server serves as a reference.

The download proxy unit 71 supports multiple download protocols, downloads data according to the download notification of the second request route server interaction managing unit, calculates the edge network content ID, calculates the temporary content ID of the edge network, and judges whether the data to be downloaded as notified by the request route server is already stored locally.

The download proxy server performs the foregoing judgment for this purpose: The request route server stores the mapping between the content ID of the data under different protocols and the unified edge network content ID, and the same data has different content IDs under different download protocols so that the following circumstance may occur: The data requested by the client and the edge network content ID of the data have been stored in the edge network (on other clients or the download proxy server), but no mapping between the edge network content ID and the current download protocol content ID exists. Therefore, the request route server is unable to search out the edge network content ID of the data according to the current download protocol content ID. A possible cause is: The edge network initially requests to download the data content stored in the network through the current download protocol. For example, data A is stored in the edge network, and its edge network ID is a. The request route server stores the mapping between the edge network ID "a" and the content ID "x" of data A under the BT protocol, and the mapping between the edge network ID "a" and the content ID "y" of data A under the eMule protocol. However, when a client in the edge network initially requests to download data A through the FTP protocol, the request route server has not set up the mapping between the content ID "z" of data A under the FTP protocol and the content ID "a" of the edge network. Therefore, the request route server is unable to find the existing data A in the edge network.

For this reason, the download proxy server in this embodiment further judges whether the data requested by the client is already stored in the edge network. The judgment method is: according to preset rules, downloading the file header data of a preset length, downloading the file trailer data of a preset length, and calculating out the temporary content ID of the edge network of the part of downloaded data in the following method:

Hash (file header data of a preset length+file trailer data of a preset length+file length).

Alternatively, the temporary content ID of the edge network may be calculated out according to the parameters such as file length.

As against the calculated temporary content ID of the edge network, the download proxy server searches for the stored temporary content IDs of the edge network in the storing unit to check whether any stored temporary content ID matches the calculated temporary content ID of the edge network.

If any matching item is found, the download proxy server obtains the edge network content ID of the data, and reports it to the request route server through the second request route server interaction managing unit 74. If the download proxy server stores the temporary content ID of the edge network but stores no edge network content ID at this time, it is deemed that the download proxy server is downloading the data content, and the download proxy server may report the temporary content ID of the edge network to the request route server.

If no matching item exists, it indicates that the storing unit of the download proxy server has not stored the data content being downloaded currently. Therefore, the temporary content ID of the edge network calculated out by the download proxy unit 71 is reported to the request route server through the second request route server interaction managing unit 74. Moreover, the storing unit stores the data content, and the mapping between the downloaded data and the temporary content ID of the edge network. Upon completion of downloading the data, the download proxy unit 71 calculates out the edge network content ID according to the complete data content, stores the ID, and sends the ID to the request route server through the second request route server interaction managing unit.

The edge network content ID may be calculated according to the complete data content in many methods, which are not limited by the present disclosure. Any method is practicable if it can obtain a unique ID, for example, MD4 (the whole file content), MD4 (the whole file content), SHA1 (the whole file content).

Reporting the temporary content ID of the edge network to the request route server makes the client begin to download the part of data already downloaded to the edge network before the download proxy server finishes downloading all the data to the edge network.

On the basis of the foregoing judgment method, the download proxy unit 71 may obtain the check data of the data being downloaded currently under the current download protocol after calculating out the temporary content ID of the edge network. Further, the download proxy unit 71 combines the temporary content ID of the edge network with the check data of the protocol to judge whether the data being downloaded currently is already stored locally.

The check data of the protocol refers to the check data of the file specific to a download protocol according to the method for calculating the check data in the download protocol. Below is an example:

The method for calculating file check data in the eMule protocol is: dividing the file into blocks, each of which is 9.28 MB in size (the last block may be smaller than 9.28 MB) and calculating the check value of each block through an MD4 algorithm.

In the BT protocol, the method for calculating the file check data is: In the BT protocol, the content is identified per directory, and then the whole file is divided into blocks, and the size of each block is 256 KB; for a single file, the location of the file in the directory and the location of the first complete file fragment in the file are determined first, and the check values of the complete file fragments corresponding to the file are calculated through an SHA1 algorithm consecutively. Supposing a seed includes three files, the procedure for calculating the second file check data is: First, the location of the first complete block corresponding to file 2 in file 2 is determined, and then the check values of the subsequent data blocks are calculated consecutively.

As regards other download protocols, those skilled in the art may obtain the check data with reference to relevant disclosed algorithms.

Figure 8:
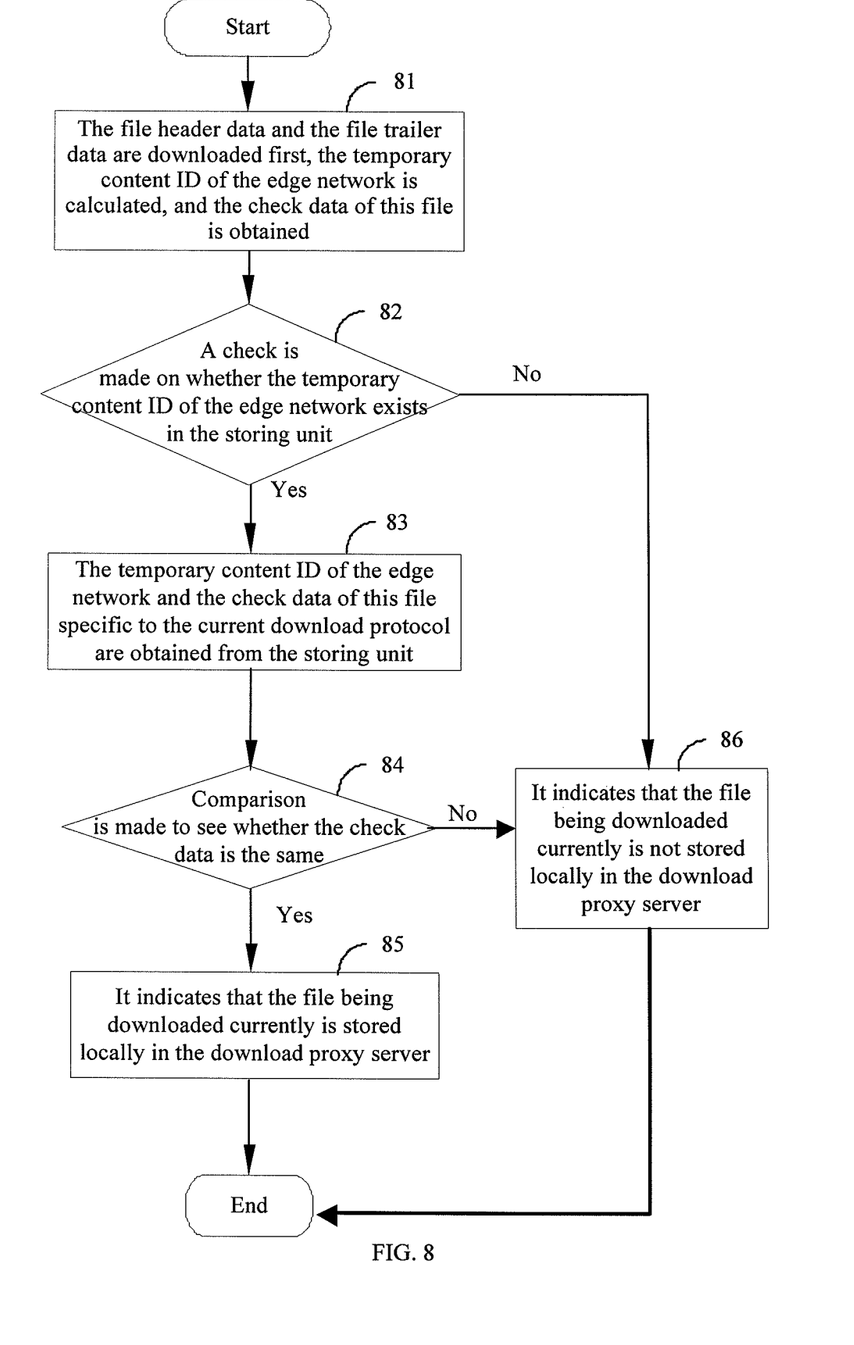
FIG. 8 is a flowchart of a download proxy server judging whether the data currently to be downloaded is stored locally according to an embodiment of the present disclosure.

With reference to FIG. 8, a method is provided below for combining the temporary content ID of the edge network with the check data to judge whether the data being downloaded currently is already stored locally.

81. The file header data and the file trailer data are downloaded first, the temporary content ID of the edge network is calculated, and the check data of this data content is obtained.

82. A check is made on whether the temporary content ID of the edge network exists in the storing unit. If the temporary content ID exists, the process proceeds to step 83, or else step 86.

83. The temporary content ID of the edge network and the check data of this data content specific to the current download protocol are obtained from the storing unit.

84. The check data is compared. If the check data is the same, the process proceeds to step 85; otherwise, the process proceeds to step 86.

85. It is determined that the data being downloaded currently is already stored locally in the proxy server.

86. It is determined that the data being downloaded currently is not stored locally in the proxy server.

The storing unit 72 stores and manages the data content of the download proxy server.

Detailed above are a file data distribution method and the relevant devices provided in the embodiments of the present disclosure. Although exemplary embodiments are described, the claims are not limited to such embodiments. It is apparent that those skilled in the art can make various modifications and variations to the embodiments disclosed in this application without departing from the spirit and scope of the claims. The claims shall cover the modifications and variations provided that they fall in the scope of protection defined by the claims or their equivalents.

What is claimed is:

1. A data distribution method, comprising:
    obtaining a data download request from a client in an edge network;
    obtaining a content ID of data under a specific protocol, wherein the content ID is carried in the data download request;
    searching for an edge network content ID that corresponds to the content ID and at least one additional content ID, wherein the edge network content ID is used to identify data contents already available inside the edge network; and
    obtaining corresponding client information by using the edge network content ID as an index, and returning data source information that carries the client information to the client;
    notifying, if the edge network content ID is not found, a download proxy server to download the data requested by the client to a local storage device;
    calculating and storing the edge network content ID of the data;
    receiving the edge network content ID returned by a download server, and
    sending the edge network content ID and the data source information that carries local storage device information to the client;
    wherein if the edge network content ID corresponding to the content ID is not found, before the download proxy server finishes downloading the data to the local storage device, the method further comprises:
    downloading a part of file data according to preset rules and calculating out a temporary content ID of the edge network;
    searching stored temporary content IDs of the edge network;
    calculating check data of the data corresponding to a matching temporary content ID of the edge network specific to a currently used download protocol if any matching temporary content ID of the edge network is found;
    sending an edge network ID of the data to the client if the check data is determined to be the same as check data of the data being downloaded currently; and
    sending the calculated temporary content ID of the edge network to the client, if the check data is determined to be different from the check data of the data being downloaded currently.

2. The method of claim 1, wherein the method for calculating out the temporary content ID of the edge network further comprises:
    performing Hash calculation for file header data of a preset length, file trailer data of a preset length, and file length.

3. A data distribution system, comprising:
    a request route server, configured to: obtain a data download request from a client in an edge network, wherein the data download request carries a content ID of data to be downloaded by the client under a protocol, search for an edge network content ID corresponding to the content ID under the protocol and at least one additional content ID under other protocol, obtain corresponding client information by using the edge network content ID as an index, and return data source information that carries the client information to the client, send the edge network content ID returned by a download proxy server and the data source information that carries proxy server information to the client, and save a mapping between the edge network content ID and the content ID; wherein the edge network content ID is used to identify data contents already available; and
    a download proxy server configured to:
    download the data according to a notification from the request route server, and return the edge network content ID; determine whether data being downloaded currently is already stored, and if the data being downloaded is already stored, stop downloading the data, and send the edge network content ID of the data to the request route server; and
    download a part of file data according to preset rules, calculate out a temporary content ID of an edge network, and search temporary content IDs of the edge network already stored by the download proxy server, calculate check data of the data corresponding to the matching temporary content ID of the edge network specific to a current download protocol for a matching temporary content ID of the edge network, and determine that the proxy server already stores the data being downloaded currently if the check data is the same as check data of the data being downloaded currently.

4. The system of claim 3, wherein:
    the download proxy server is notified to download the data if the request route server does not store the edge network content ID corresponding to the content ID.

5. The system of claim 3, wherein the download proxy server is further configured to:
    perform a Hash calculation for file header data of a preset length, file trailer data of a preset length, and file length.

6. The system of claim 3, wherein:
    the download proxy server is configured to: download the data according to an instruction of the request route server if the data being downloaded currently is not stored locally, generate and store the edge network content ID, and send the edge network content ID to the request route server.

7. The system of claim 6, wherein:
    the download proxy server is further configured to send the temporary content ID of the edge network to the request route server; and the request route server is configured to: save the mapping between the temporary content ID of the edge network and the content ID, send the mapping to the client; and update the mapping between the temporary content ID of the edge network and the content ID according to the edge network content ID generated by the download proxy server after the data is downloaded.

8. The system of claim 7, further comprising a client configured to:
obtain a data download instruction based on a download protocol, and send a download request to the request route server, wherein the request carries the content ID of the data to be downloaded by the client under the protocol,
wherein the download proxy server is further configured to: obtain the edge network content ID or the temporary content ID of the edge network, and obtain the data corresponding to the edge network content ID or the temporary content ID of the edge network from a data source; and
the request route server is further configured to save a mapping between the client and the edge network content ID or a temporary network file ID.

9. A download proxy server, comprising:
a connection managing unit configured to perform data interaction with an external device;
a client interaction managing unit configured to perform data interaction with a client through the connection managing unit;
a request route server interaction managing unit configured to perform data interaction with a request route server through the connection managing unit, obtain a data download notification from the request route server, send the data download notification to a download proxy unit, receive an edge network content ID returned by the download proxy unit, and send the edge network content ID to the request route server, wherein the edge network content ID corresponds to the content ID and at least one additional content ID and the edge network content ID is used to identify data contents already available inside the edge network;
a download proxy unit configured to download data according to the download notification, and calculate the edge network content ID; and to download a part of the data according to preset rules, calculate a temporary content ID of an edge network, and send it to the storing unit, and stop downloading the data if the storing unit determines that the data being downloaded currently is already stored;
a storing unit configured to store and manage data content, comprising the edge network content ID and the data corresponding to the edge network content ID and to determine whether the data being downloaded currently is already stored according to the temporary content ID of the edge network calculated out by the download proxy unit, notify the download proxy unit if the data being downloaded currently is already stored, save the temporary content ID of the edge network and a mapping between the temporary content ID of the edge network and the data being downloaded currently if the data being downloaded currently is not already stored; and
the request route server interaction managing unit is further configured to obtain and send the edge network content ID of the data stored in the storing unit if the storing unit determines that the data being downloaded currently is already stored, and obtain and send the temporary content ID of the edge network generated by the download proxy unit if the storing unit determines that the data being downloaded currently is not already stored.

10. The download proxy server of claim 9, wherein:
the download proxy unit is configured to: download the data according to a download request, and then calculate the edge network content ID;
the storing unit is configured to store a mapping between the edge network content ID, the temporary content ID of the edge network, and the data; and
the request route server interaction managing unit is configured to send the edge network content ID calculated out after the download proxy unit finishes downloading the data.

* * * * *